United States Patent
Shee

(10) Patent No.: US 9,372,825 B1
(45) Date of Patent: Jun. 21, 2016

(54) GLOBAL NON-VOLATILE SOLID-STATE CACHE IN A NETWORK STORAGE SYSTEM

(71) Applicant: NetApp, Inc., Sunnyvale, CA (US)

(72) Inventor: Shaswati Shee, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 474 days.

(21) Appl. No.: 13/779,640

(22) Filed: Feb. 27, 2013

(51) Int. Cl.
*G06F 15/167* (2006.01)
*G06F 15/173* (2006.01)

(52) U.S. Cl.
CPC ................... *G06F 15/17331* (2013.01)

(58) Field of Classification Search
CPC ....................................... G06F 9/5016
USPC ......................... 709/213, 215, 224
See application file for complete search history.

(56) References Cited

U.S. PATENT DOCUMENTS

| | | | |
|---|---|---|---|
| 2012/0047312 A1* | 2/2012 | Nathuji et al. | 711/6 |
| 2013/0166724 A1* | 6/2013 | Bairavasundaram et al. | 709/224 |
| 2013/0290667 A1* | 10/2013 | Dixit et al. | 711/173 |
| 2014/0025890 A1* | 1/2014 | Bert et al. | 711/118 |
| 2014/0359044 A1* | 12/2014 | Davis et al. | 709/213 |

\* cited by examiner

*Primary Examiner* — David Lazaro
*Assistant Examiner* — Marie Georges Henry
(74) *Attorney, Agent, or Firm* — Haynes and Boone, LLP

(57) ABSTRACT

A network storage controller uses a non-volatile solid-state memory (NVSSM) subsystem as a global cache that is shared between a number of network storage servers in a network storage system. Portions of global cache are allocated to each of the network storage servers. Allocation of portions of the global cache is controlled based on a usage pattern of the global cache by each of the network storage servers. The storage operating system determines, for example, a percentage of cache hit and/or a response time for responding to the requests from the clients by a particular network storage server with a particular allocated portion. The percentage of cache hit and response time are projected for various potential sizes of the particular portion. A size of the particular portion that provides a better percentage of cache hit and/or response time is selected, and reallocated to the particular network storage server.

20 Claims, 8 Drawing Sheets

GLOBAL NON-VOLATILE SOLID-STATE CACHE IN A NETWORK STORAGE SYSTEM

FIELD OF THE INVENTION

At least one embodiment of the present invention pertains to network storage systems, and more particularly, to the use of a non-volatile solid-state cache that is shared between multiple storage servers in a network storage system.

BACKGROUND

A storage server is a type of network storage controller which is a special purpose data processing system used to store and retrieve data on behalf of one or more clients on a network. A storage server operates on behalf of one or more clients to store and manage data in a set of mass storage devices, such as magnetic or optical storage-based disks or tapes. In conventional network storage systems, the mass storage devices may be organized into one or more groups of drives (e.g., redundant array of inexpensive disks (RAID)). A storage server also typically includes internal memory that is used as a buffer cache, to speed up the reading and writing of data from and to (respectively) the main mass storage system. In conventional storage servers, this buffer cache typically is implemented the form of dynamic random access memory (DRAM).

It is desirable to improve the performance of any data processing system. In the case of a storage server, one way to accomplish this is by reducing the latency and increasing the random access throughput associated with accessing the storage server's main mass storage subsystem. In this regard, flash memory, particularly NAND flash memory, has certain very desirable properties. Flash memory generally has a very fast read access speed compared to that of conventional disk drive. Accordingly, flash based cache is used to temporarily store data in the storage server. The client requests are served by obtaining data from the flash based cache. By having flash based cache in the storage server, the data access speed is improved. The greater the size of the flash cache in the storage server, the more data can be cached in the flash cache, which results in better performance of the application data access from the storage server. However, flash based caching adds cost to the overall storage solution, and inappropriate sizing for flash based cache may result in higher cost of ownership for the system.

Datacenters typically have a number of storage servers. Each of the storage servers may have its own local cache, which can be flash based. Based on the load on each of the storage servers, at any point of time, some storage servers might be seeking more cache to cache more data blocks, whereas other storage servers might not be utilizing all the cache available to them. That is, the cache of some storage servers may be under-utilized, while the cache of other storage servers may be over-utilized. This results in an ineffective and inefficient storage ecosystem, deteriorating the overall performance of the datacenter. One solution to this problem can be to manually uninstall the cache from the under-utilized storage server and install it in the over-utilized storage server. However, this is not an effective solution, at least because it may slow down the overall performance of the storage servers during un-installation and installation of the cache, and because it requires a human to perform the uninstallation and installation of the cache.

SUMMARY

Described herein is a network storage server that has mass storage embodied as non-volatile solid-state memory (NVSSM). The NVSSM in the network storage server is used as a cache (also referred to as "global cache") to store data read from, and/or data to be written to, multiple storage servers in a network storage system to improve the data access speed for the clients. The technique introduced here supports allocation of a portion of the global cache to each of multiple storage servers in a network storage system based on the usage pattern of the global cache by each of the multiple storage servers. The usage of the global cache by each of the multiple storage servers is monitored continuously, and the size of the portion of the global cache allocated to the each of the multiple storage servers is adjusted accordingly based on the usage pattern.

In at least some embodiments, the size of each of the portions is adjusted based on percentage of cache hit and/or a response time for serving the requests of the clients. For each of the portions, a current percentage of cache hit and/or a current response time is monitored, and a percentage of cache hit and/or a response time is projected for various potential sizes of the corresponding portion. A potential size that provides an optimal percentage of cache hit and/or response time for each of the portions is selected, and the portions having the corresponding selected potential sizes are allocated to the corresponding network storage servers.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
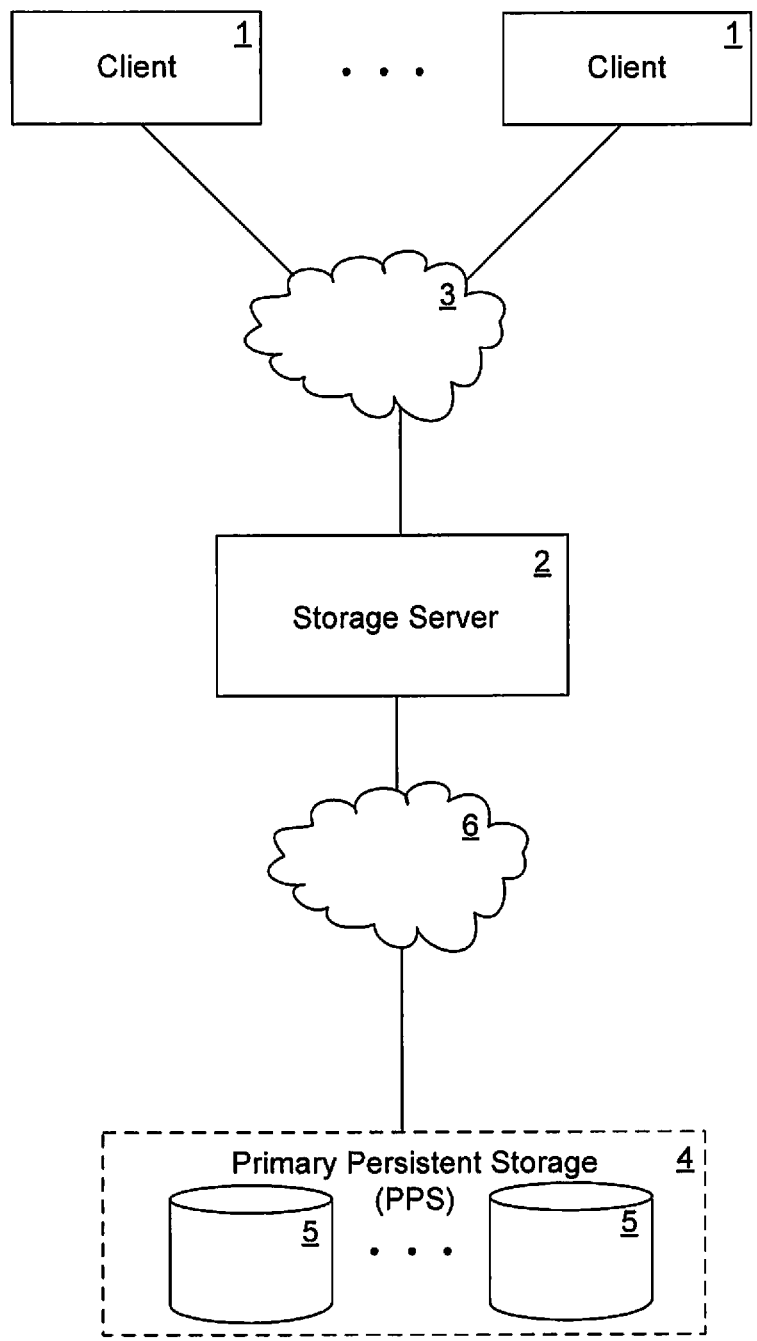
FIG. 1 illustrates a network storage system in which the present invention can be implemented.

A method and apparatus for facilitating the use of a non-volatile solid-state cache shared between a number of network storage controllers in a network storage system are described. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment; however, neither are such occurrences mutually exclusive necessarily. Further, note that the terms "network storage controller," "network storage server," or "storage server" are used interchangeably.

Described herein is a network storage server that has mass storage embodied as non-volatile solid-state memory (NVSSM). In some embodiments the NVSSM may be flash memory. In other embodiments, however, it may be another form of NVSSM, such as battery-backed RAM. The term "flash cache network storage server" is used in this description as shorthand to refer to a network storage server that is configured for use as a network cache and that has mass storage implemented by any form of NVSSM, which preferably may be, but is not necessarily, flash memory.

As described in greater detail below, the NVSSM in a flash cache network storage server is used as a cache (also referred to as "global cache") to store data read from, and/or data to be written to, multiple storage servers in a network storage system to improve the data access speed for the clients. The term "global cache," therefore, means a cache that is shared between multiple storage servers or other processing devices coupled to each other over a network. The requests from the clients of the multiple storage servers are serviced by obtaining data from, or writing data to, the global cache of the flash cache network storage server, which is comparatively faster than obtaining the data from a primary storage of the storage server. The global cache can be implemented by, for example, NVSSM memory such as flash memory. Some examples of flash memory implementations include Peripheral Component Interconnect express (PCIe) based flash modules or flash based Solid State Drives (SSDs).

To avoid the problems associated with using a local cache on each of the multiple storage servers in the network storage system, a global cache that is shared between multiple storage servers can be used to temporarily store data to respond to requests from the clients. The techniques introduced here allow the advantages of global cache to be obtained without incurring the under-utilization or the over-utilization problem normally associated with using local cache based storage servers in the network storage system.

The technique introduced here supports allocation of a portion of the global cache to each of multiple storage servers in a network storage system based on the usage pattern of the global cache by each of the multiple storage servers. As described in greater detail below, the usage of the global cache by each of the multiple storage servers is monitored continuously, and the size of the portion of the global cache allocated to the each of the multiple storage servers is adjusted accordingly based on the usage pattern. In at least some embodiments, the size of each of the portions is adjusted based on percentage of cache hit and/or a response time for serving the requests of the clients. For each of the portions, a current percentage of cache hit and/or a current response time is monitored, and a percentage of cache hit and/or a response time is projected for various potential sizes of the corresponding portion. A potential size that provides an optimal percentage of cache hit and/or response time for each of the portions is selected, and the portions having the corresponding selected potential sizes are allocated to the corresponding network storage servers.

The embodiments described herein relate to a network storage server merely as an example, to facilitate description of the techniques being introduced. It will be recognized, however, that the techniques introduced here can be applied to other types of data processing systems as well.

FIG. 1 is a block diagram illustrating a network storage system in which the present invention can be implemented. In FIG. 1, a network storage server 2 is coupled to a primary persistent storage (PPS) subsystem 4 that includes multiple non-volatile mass storage devices, and to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

The storage server 2 manages storage of data in the PPS subsystem 4. The storage server 2 receives and responds to various read requests and write requests from the clients 1, directed to data stored in, or to be stored in, the storage subsystem 4. The storage server 2 communicates with the PPS subsystem 4 over an interconnect 6. The interconnect 6 may support any of various types communication protocols, such as Ethernet iWarp, Fibre Channel Virtual Interface (FCVI), InfiniBand, PCIe, or the like.

In accordance with the techniques introduced here, the mass storage devices 5 in the PPS subsystem 4 can be non-volatile solid-state memory, including flash memory. Alternatively, they can be, for example, conventional magnetic or optical disks or tape drives. The mass storage devices 5 can be organized as one or more Redundant Array of Inexpensive Disk/Device (RAID) groups, in which case the storage server 2 accesses the PPS subsystem 4 using one or more well-known RAID algorithms. It will be recognized that the techniques introduced here can also be used to access flash memory used for other purposes.

The storage server 2 may provide file-level data access service to clients 1, such as commonly done by a storage server in a network attached storage (NAS) environment (i.e., a "filer"), or block-level data access service such as commonly done by a storage server in a storage area network (SAN) environment; or, it may be capable of providing both file-level data access service and block-level data access service. Further, although the storage server 2 is illustrated as a single unit in FIG. 1, the storage server 2 can have a distributed architecture. For example, the storage server 2 can include a physically separate N- (network-) blade and D- (data-) blade that communicate over an interconnect (not shown).

Figure 2:
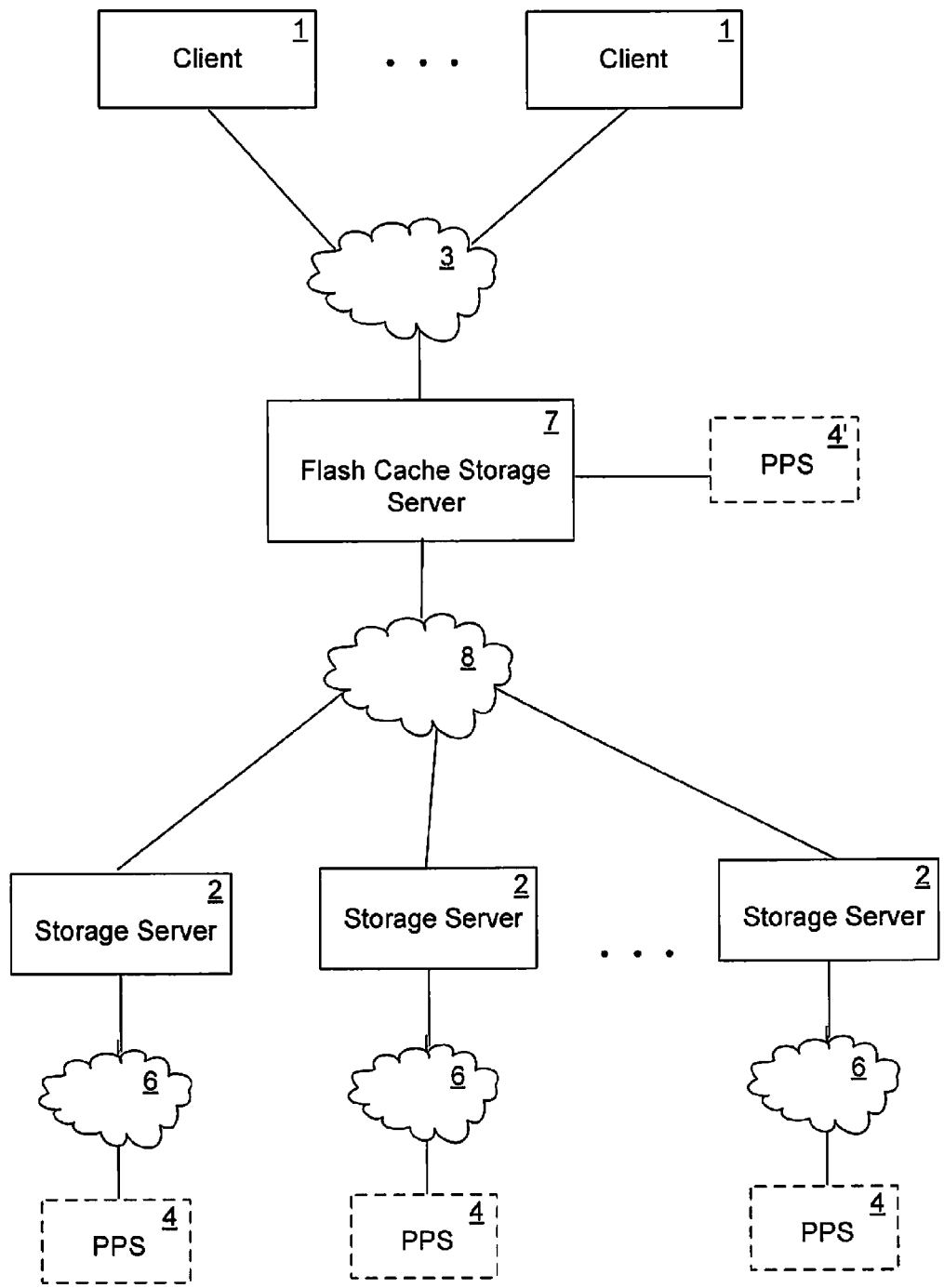
FIG. 2 is a high-level block diagram showing an example of another network storage system having a flash cache network storage server with a global cache, according to one embodiment.

FIG. 2 is a block diagram illustrating a network storage system including a flash cache storage server, according to an embodiment of the disclosed technique. The flash cache network storage server 7 includes a global cache that is shared between storage servers such as storage servers 2. In at least some embodiments, a PPS subsystem 4' of the flash cache network storage server 7 is used as the global cache for the storage servers 2. Further, the PPS subsystem 4' of the flash cache storage server 7 is implemented using a NVSSM such as a flash memory, which offers higher data access speeds compared to PPS subsystem 4 of the storage servers 2 which may be implemented using HDD, magnetic tapes, etc.

Upon receiving read requests from clients 1, the flash cache storage server 7 determines whether the requested data is available in the global cache. If requested data is contained in the global cache, the requests are served by reading the data from the global cache. Otherwise, the data is fetched from its long-term storage location, which can be the PPS 4 of a storage server 2 to which the request is originally issued. Obtaining the data from the global cache is faster compared to obtaining from the PPS 4 of the storage servers 2 since the flash-based global cache of the flash cache network storage server offers higher data access speeds compared to the non-flash based PPS subsystems 4 of the storage servers 2.

The flash cache network storage server 7 communicates with the storage servers 2 over an interconnect 8. The interconnect 8 may support any of various types communication protocols, such as Ethernet iWarp, Fibre Channel Virtual Interface (FCVI), InfiniBand, PCIe, or the like. An example of an interconnect 8 includes a network switch, such as Infiniband MBX 5020. Further, in at least some embodiments, a plurality of network switches, routers and/or other devices may be used between the flash cache network storage server 7 and the storage servers 2 to have a highly available architecture.

Figure 3:
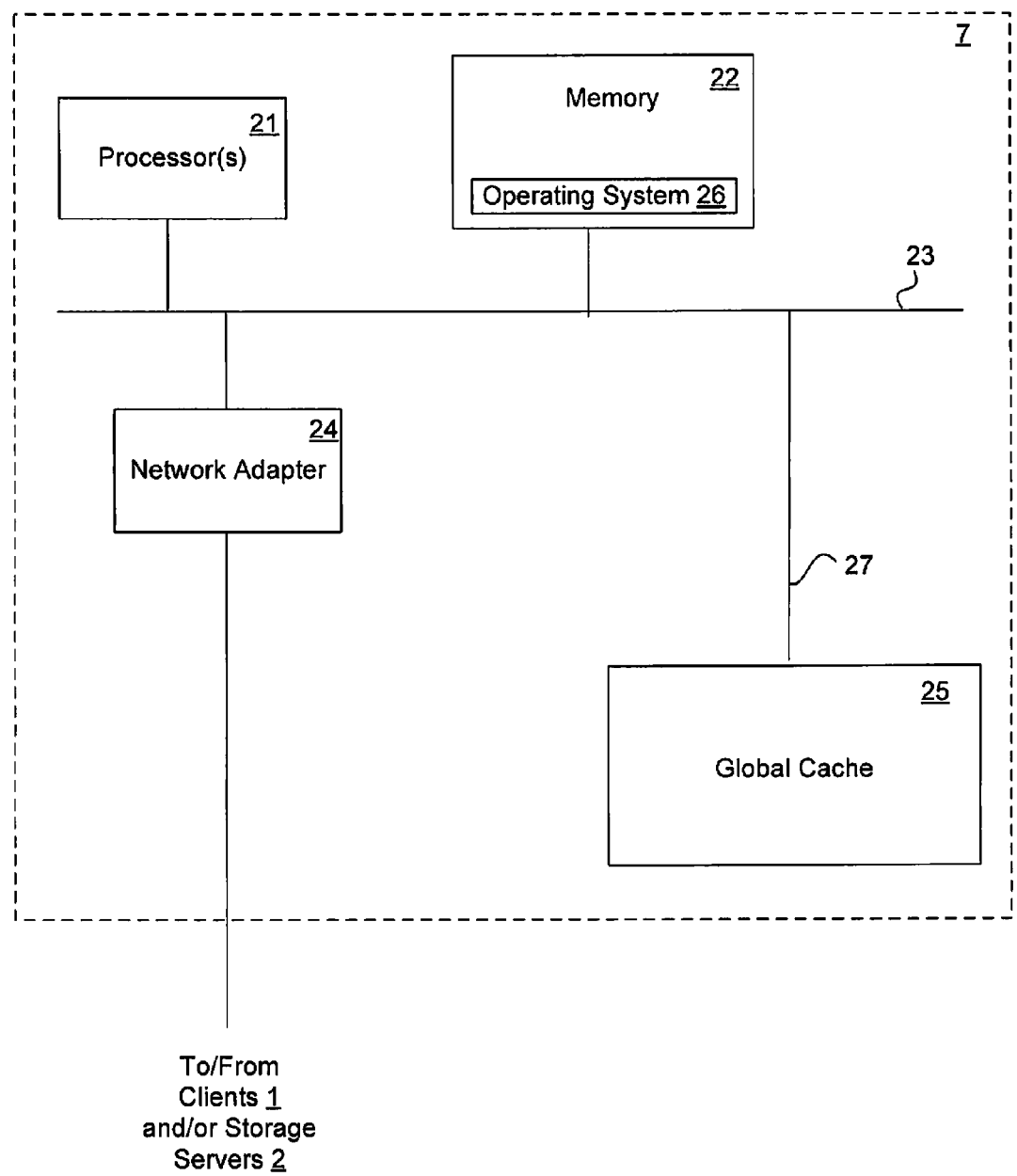
FIG. 3 shows an example of the architecture of the flash cache network storage server corresponding to the embodiment of FIG. 2.

FIG. 3 is a high-level block diagram showing an example of the architecture of the flash cache storage server 7, according to an embodiment of the disclosed technique. The flash cache storage server 7 includes one or more processors 21 and memory 22 coupled to a interconnect 23. The interconnect 23 shown in FIG. 2 is an abstraction that represents any one or more separate physical buses, point-to-point connections, or both connected by appropriate bridges, adapters, or controllers. The interconnect 23, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, an Institute of Electrical and Electronics Engineers (IEEE) standard 1394 bus (sometimes referred to as "Firewire"), or any combination of such interconnects.

The processor(s) 21 include central processing units (CPUs) of the flash cache storage server 7 and, thus, control the overall operation of the flash cache storage server 7. In certain embodiments, the processor(s) 21 accomplish this by executing software or firmware stored in memory 22. The processor(s) 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 22 is, or includes, the main memory of the flash cache storage server 7. The memory 22 represents any form of random access memory (RAM), read-only memory (ROM), flash memory, or the like, or a combination of such devices. In use, the memory 22 may contain, among other things, at least a portion of the storage operating system 26 of the flash cache storage server 7.

Also connected to the processor(s) 21 through the interconnect 23 is a network adapter 24. The network adapter 24 provides the flash cache storage server 7 with the ability to communicate with remote devices, such as clients 1, over a network 3 and may be, for example, an Ethernet, Fibre Channel, ATM, or Infiniband adapter. The interconnect 27 allows the flash cache storage server 7 to access its PPS subsystem, that is, global cache 25, which may be implemented as a NVSSM such as flash memory. In one embodiment, the interconnect 27 is a PCI express (PCIe) bus. Note that in some embodiments, global cache 25 may be physically external to the other components of the flash cache storage server 7, though access to it is controlled by processor(s) 21. Furthermore, in some embodiments the flash cache storage server 7 may also have one or more other storage facilities, such as a disk-based storage subsystem, in addition to flash based storage.

Figure 4:
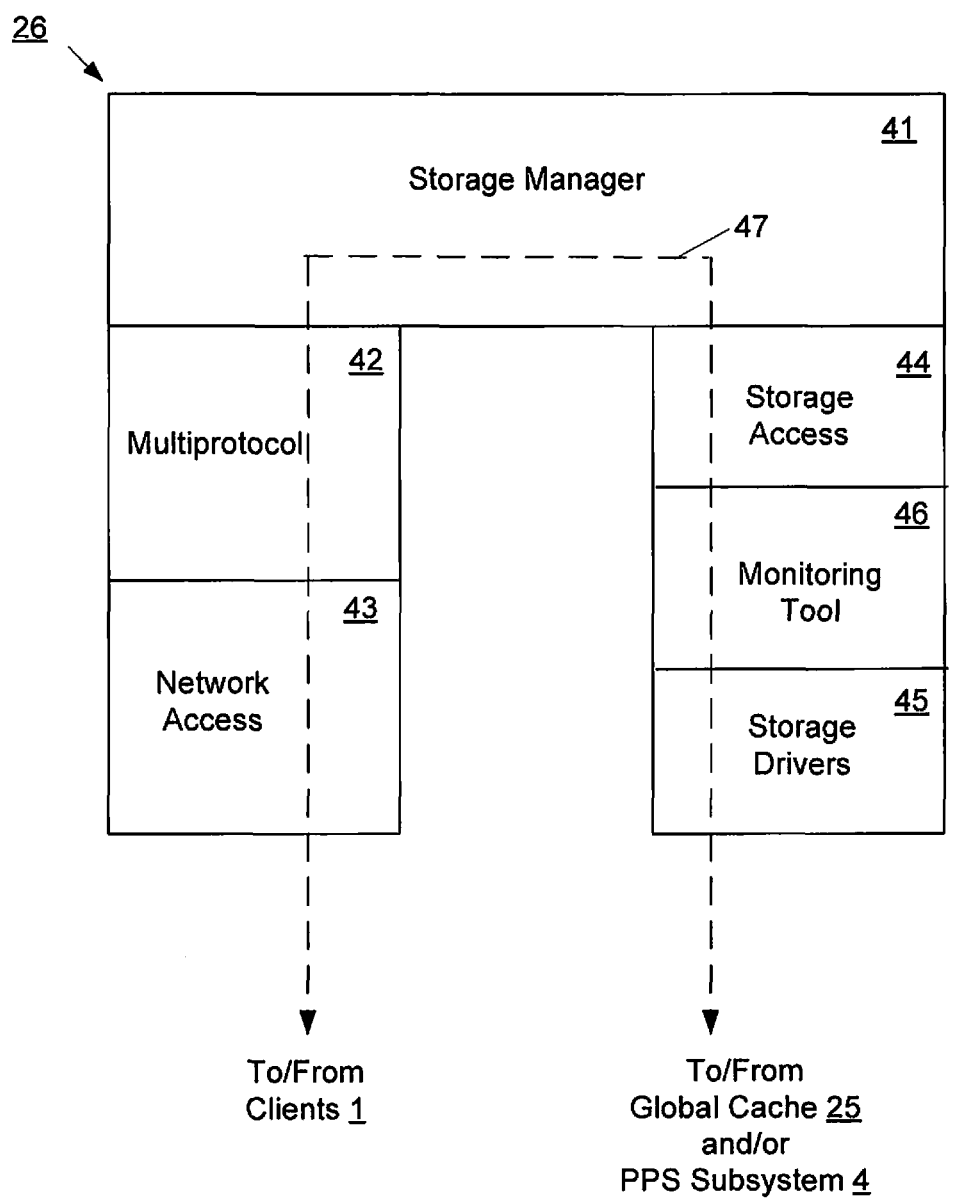
FIG. 4 shows an example of the architecture of a storage operating system in the flash cache network storage server.

FIG. 4 schematically illustrates an example of a storage operating system 26 that can be implemented in the flash cache network storage server 7. Storage operating system 26 can also be generally representative of a storage operating system in each of the storage servers 2, except to the extent that it is specially configured to manage the global cache 25 as described below. As shown, the storage operating system 26 includes several software modules, or "layers". These layers include a storage manager 41, which is the core functional element of the storage operating system 26. The storage manager 41 is, in certain embodiments, software, which imposes a structure (e.g., a hierarchy) on the data stored in the PPS subsystem 4 (e.g., in the flash-based global cache 25), and which services read and write requests from clients 1. In one embodiment, the storage manager 41 manages allocation and reallocation of portions of the global cache 25 to clients 1 based on the usage pattern of the portions by each of the storage servers 2. Note that part of these functions of the storage manager 41 can be delegated to monitoring tool 46 as described with reference to FIGS. 5-8.

To allow the storage server 2 to communicate over the network 3 (e.g., with clients 1), the storage operating system 26 also includes a multiprotocol layer 42 and a network access layer 43 logically "under" the storage manager 41. The multiprotocol 42 layer implements various higher-level network protocols, such as Network File System (NFS), Common Internet File System (CIFS), Hypertext Transfer Protocol (HTTP), user datagram protocol (UDP) and Transmission Control Protocol/Internet Protocol (TCP/IP). The network access layer 43 includes one or more network drivers that implement one or more lower-level protocols to communicate over the network 3, such as Ethernet, Fibre Channel, InfiniBand or Internet small computer system interface (iSCSI).

Also, to allow the storage server 2 to communicate with the PPS subsystem 4, the storage operating system 26 includes a storage access layer 44, an associated storage driver layer 45 logically under the storage manager 41. The storage access layer 44 implements a higher-level storage redundancy algorithm, such as RAID-3, RAID-4, RAID-5, RAID-6 or RAID-DP. The storage driver layer 45 implements a lower-level protocol.

The monitoring tool 46 can determine the usage pattern of each of the portions of the global cache and help the storage operating system 26 to select a suitable size for each of portions of the global cache such that a percentage of cache hit and/or a response time for serving the requests from clients 1 increases, thereby increasing the performance of the network storage server to which the portion is allocated.

If the PPS subsystem 4 is implemented as the NVSSM subsystem 26, as described above, then the storage driver layer 45 implements a network protocol such as FCVI, InfiniBand, or iWarp. Also shown in FIG. 4 is the path 47 of data flow, through the storage operating system 26, associated with a read or write operation.

In at least some embodiments of the technique introduced here, the storage operating system 26 is configured to allocate portions of the global cache 25 to each of the storage servers 2, to continuously monitor the allocated portions, and to adjust the size of portions based on the usage pattern of the portions by the storage servers 2.

Figure 5:
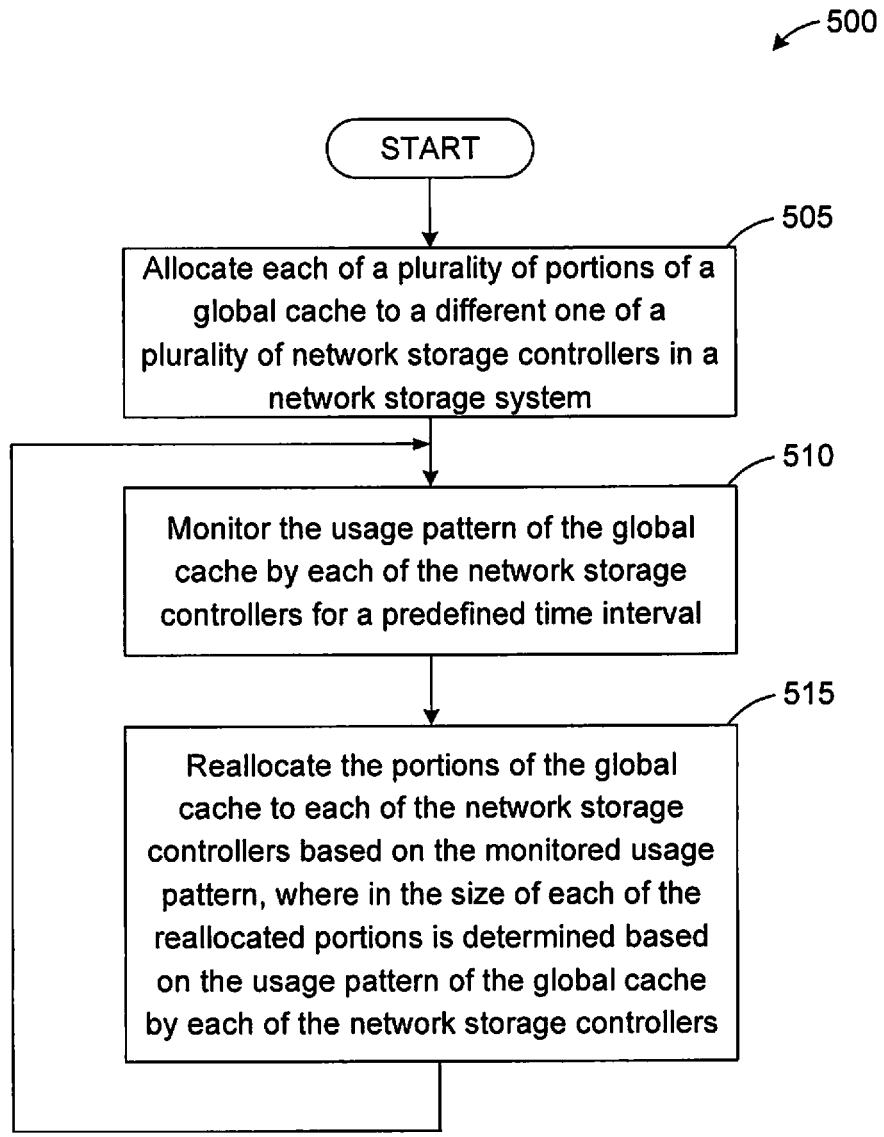
FIG. 5 is a flow diagram showing a process of allocating portions of the global cache to network storage servers.

FIG. 5 is a flow diagram illustrating a process of allocating portions of a global cache to storage servers of a network storage system based on a usage pattern of the portions by each of the storage servers, according to an embodiment of the disclosed technique. The method 500 may be executed in a system such as network storage system of FIG. 2, and more specifically, in the flash cache storage server 7. At step 505, the storage operating system 26 of the flash cache network storage server 7 allocates each of a plurality of portions of the global cache 25 to a different one of the storage servers 2. At step 510, the monitoring tool 46 monitors the usage pattern of each of the portions 30 by the corresponding storage servers 2. At step 515, the monitoring tool 46 selects a size of each of the portions 30 based on the usage pattern of the global cache 25 by each of the storage servers 2, in the manner described below, and reallocates the portions 30 having the selected sizes to the corresponding storage servers 2. The process further continues to step 510.

In another embodiment, monitoring tool 46 may simply provide a recommendation to a user (e.g., a storage network administrator) via an appropriate user interface, and the user can then accept or reject the recommendation and/or manually reallocate the portions as the user deems appropriate, through the same or a separate user interface.

Figure 6:
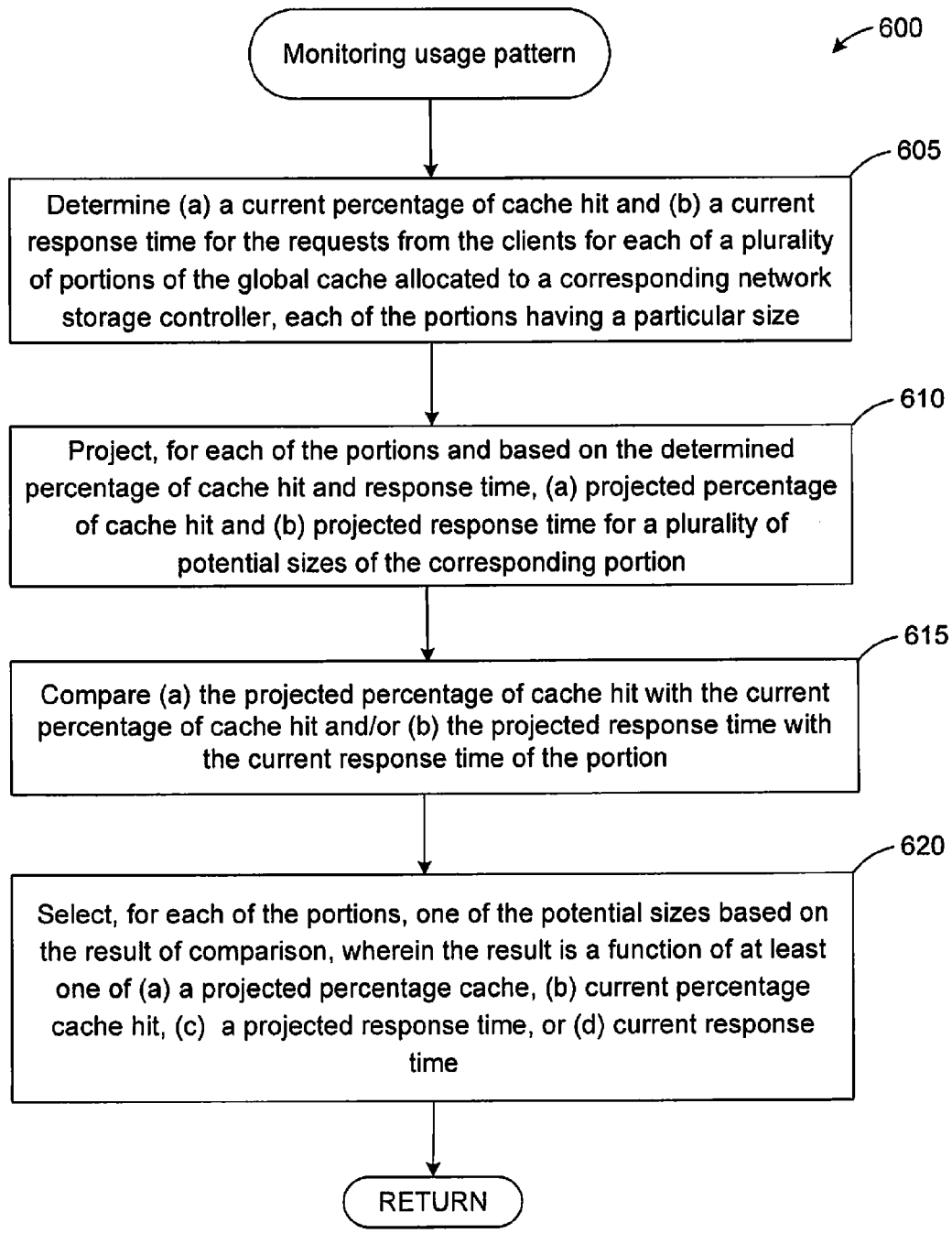
FIG. 6 is a flow diagram showing a process of monitoring a usage pattern of the portions of the global cache, and selecting a particular size for the portions of the global cache based on the usage pattern.

FIG. 6 is a flow diagram illustrating a process of monitoring a usage pattern of portions of the global cache, and selecting a particular size for each of the portions of the global cache based on the usage pattern, according to an embodiment of the disclosed technique. The process 600 may be executed in a system such as network storage system of FIG. 2. At step 605, the monitoring tool 46 determines (a) a current percentage of cache hit, or (b) a current response time for the requests from the one or more clients for each of the portions 30 of the global cache 25 for a predefined time period. At step 610, the monitoring tool 46 determines (a) a projected percentage of cache hit, and/or (b) a projected response time for the requests from the one or more clients for a plurality of potential sizes of a portion.

At step 615, the monitoring tool 46 compares (a) the projected percentage of cache hit with the current percentage of cache hit, and/or (b) the projected response time with the current response time of the portion. At step 620, based on a result of the comparison performed in step 615, the monitoring tool 46 selects, for each of the portions, a specific size for which at least one of (a) the projected percentage of cache hit is higher than the current percentage of cache hit, (b) the projected percentage of cache hit is substantially the same as the current percentage of cache hit and the specific size of the portion is smaller than the current size of the allocated portion, (c) the projected response time for the requests from the one or more clients is lower than current response time, or (d) the projected response time for the requests from the one or more clients is substantially the same as the current response time and the specific size of the portion is smaller than the current size of the allocated portion. The monitoring tool 46 performs the steps 605-620 for each of the portions 30.

Figure 7:
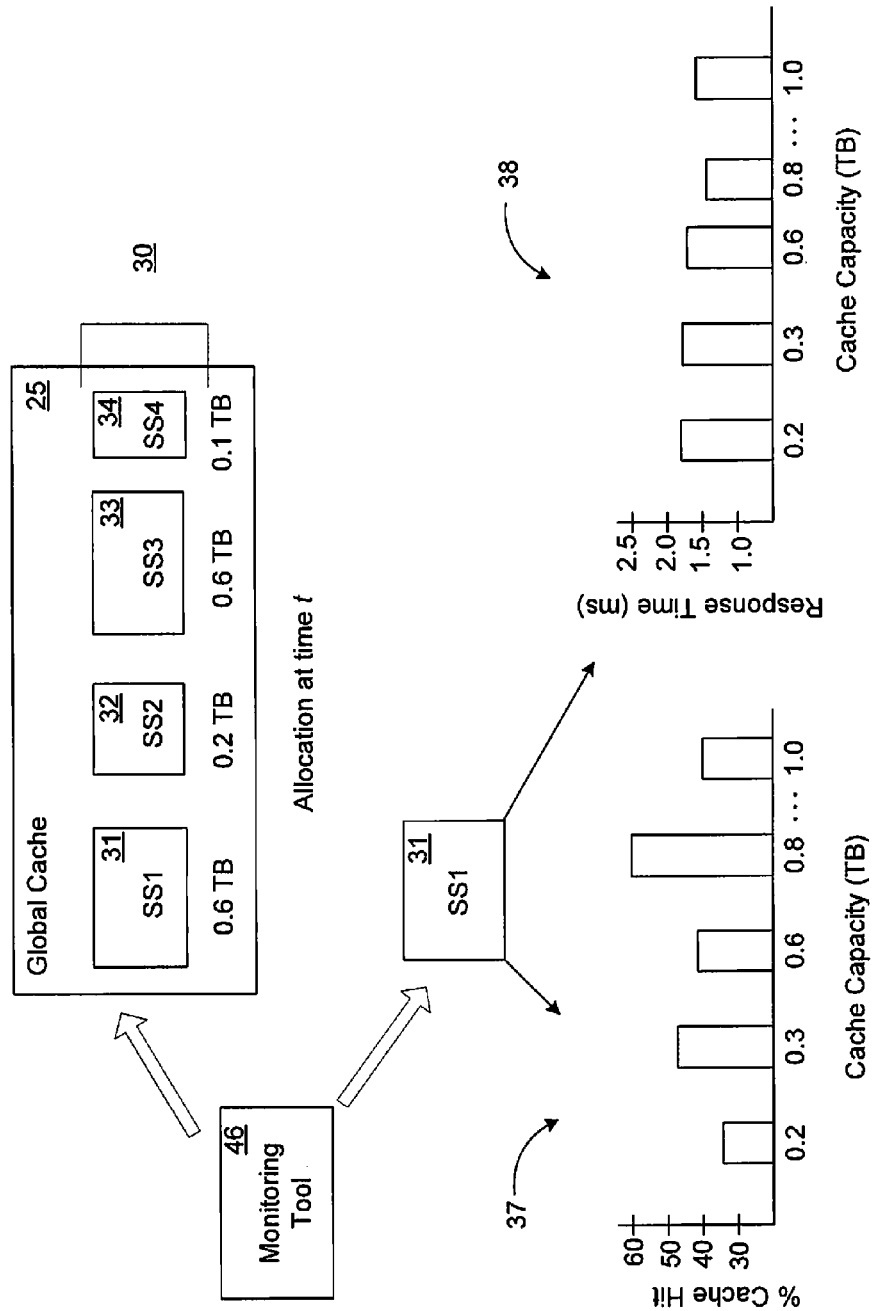
FIGS. 7 and 8 illustrate how portions of a global cache are allocated to each of the network storage servers in a network storage system.

FIG. 7 illustrates an example of allocating portions of the global cache 25 to various storage servers in the network storage system, according to an embodiment of the disclosed technique. Consider that portions 30, including a first portion 31, a second portion 32, a third portion 33 and fourth portion 34 of the global cache 25, are allocated to each of the four storage servers 2, respectively, at time t.

A monitoring tool 46 of the flash cache network storage server 7 monitors the usage pattern of each of the portions 30 by the storage servers. In at least some embodiments, the monitoring tool 46 can be part of the storage operating system 26, as shown, and can be controlled by the storage operating system 26. The usage pattern of a portion of the cache includes parameters such as a percentage of cache hit and/or a response time for serving the requests. A cache hit occurs when requested data is contained in the cache. The percentage of cache hit can be defined as the number of cache hits per one hundred (100) read requests. The response time can be defined as the average time taken to complete a response to a request (read or write) from the clients 1. In at least some embodiments, the average response time for a portion (for a predefined time interval) may be determined as follows:

$$R_{BR} = \frac{\text{Base Read Latency}}{\text{Total number of base reads}} \text{milliseconds(ms)} \quad (1)$$

$$R_{BW} = \frac{\text{Base Write Latency}}{\text{Total number of base writes}} \text{ms} \quad (2)$$

$$R_{CR} = \frac{\text{Global Cache Read Latency}}{\text{Total number global cache reads}} \text{ms} \quad (3)$$

$$R_A = \text{Sum}(R_{BR}, R_{BW}, R_{CR}) \text{ ms} \quad (4)$$

where
$R_{BR}$ is average response time for base reads (reading from PPS 4 of a storage server 2 corresponding to the portion),
$R_{BW}$ is average response time for base writes (writing into PPS 4 of a storage server 2 corresponding to the portion),
$R_{CR}$ is average response time for global cache reads (reading from the portion in the global cache),
$R_A$ is overall average response time for requests over a predefined time interval ($\Delta t$).

Note that other parameters can be used as the basis for determining the sizes and allocation of portions of the global cache to the various storage servers, aside from or in addition to those mentioned above.

The monitoring tool 46 determines the percentage of cache hit and the average response time for each of the portions 30 over the predefined time interval, $\Delta t$. The monitoring tool 46 then determines a projected percentage of cache hit and a projected average response time for a plurality of potential sizes of a portion of the cache, as shown by graphs 37 and 38 of FIG. 5. The projected percentage of cache hits and the projected response time is determined based on the current percentage of cache hit and the current average response time. The graph 37 shows projected percentage of cache hits for a number of potential sizes of the first portion 31, and the graph 38 shows projected response times for a number of potential sizes of the first portion 31.

The storage operating system 26 compares the current percentage cache hit and/or current response time for the first portion 31 with the projected percentage of cache hits and/or the projected response time for various potential sizes of the first portion 31 to select a particular size for the first portion 31. A user may configure the storage operating system 26 to select a particular size for a portion based on various criteria. For example, the storage operating system 26 may be configured to select a particular size for which (a) the projected percentage of cache hit is higher than the current percentage of cache hit, or (b) the projected response time for the requests from clients 1 is lower than the current response time. In at least some embodiments, a percentage of cache hit for a portion of the cache can be higher for a larger size portion because greater the size of the portion, the more data can be stored in the portion and higher is the probability of requested data being available in the portion of the cache. Further, more the data available in the portion of the cache, higher is the probability of obtaining the data from the cache instead of the slower long term storage system of the storage servers, and thus, lower is the response time for the requests from the clients.

In another example, the storage operating system 26 may select a particular size for which (a) the projected percentage of cache hit is substantially the same as the current percentage of cache hit but the selected size is smaller than the current size of the first portion 31, or (d) a projected response time for the requests from clients 1 is substantially the same as the current response time but the selected size is smaller than the current size of the first portion 31. The user may define ranges for percentages of cache hits and response times that are considered to be substantially the same. For example, if the percentage of cache hit is X, then X±5% may be considered to be substantially the same percentage. Similarly, in another example, if the response time is Y ms, then Y±0.5 ms may be considered to be substantially the same.

Accordingly, the storage operating system 26 selects a specific size for the first portion 31 and reallocates the first portion 31 having the selected size to the first storage server at time t+Δt. The storage operating system 26 similarly selects a specific size for the other portions 30 and reallocates the other portions 30 as portions 50 to the corresponding storage servers 2. Further, the total collective size of the portions 30 is same as the total collective size of the portions 50.

Figure 8:
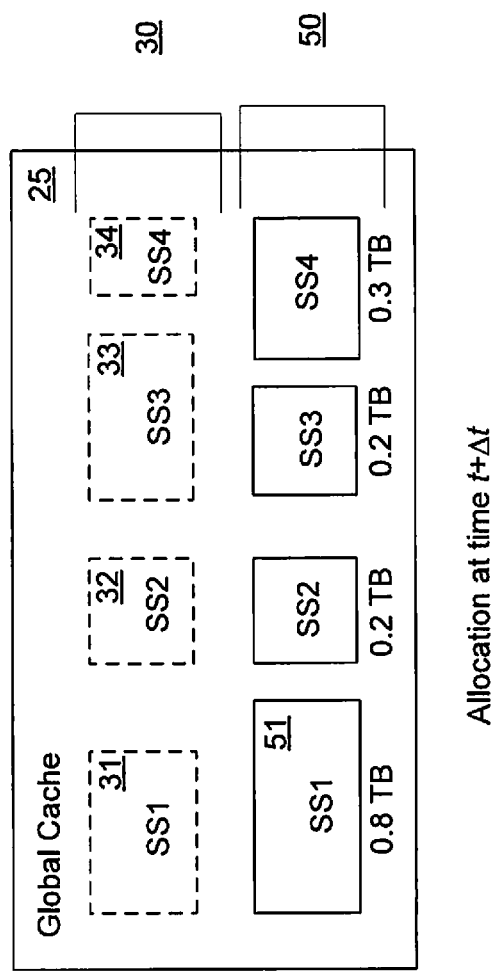

FIG. 8 depicts a global cache 25 at time t+Δt, in which the portions 30 are adjusted/resized based on the selected sizes and are allocated as portions 50 to the corresponding storage servers 2. As an example from FIGS. 7 and 8, consider that the first portion 31 allocated to the first storage server has a size of 0.6 Terabytes (TB), a cache hit of 50% and an average response time of 2 ms, for a period of time, Δt. From the graphs 37 and 38, it can be seen that for a size of 0.8 TB, the percentage of cache hit of the first portion 31 increases to 60 and the response time decreases to 1.5 ms. That is, the performance of the first storage server increases when the first portion 31 is adjusted to 0.8 TB from 0.6 TB. Accordingly, the monitoring tool 46 adjusts the size of the first portion 31 having to 0.8 TB and reallocates it as portion 51 to the first storage server as shown in FIG. 6.

In at least some embodiments, the portions of the global cache 25 are reallocated to the storage servers 2 based on a trigger condition. The trigger condition can include a predefined time period, an occurrence of an event such as a percentage of cache hit dropping below a predefined threshold, a response time exceeding a predefined threshold, addition or removal of storage capacity from one or more storage servers, or a particular time of a day, etc.

The methods and processes introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
performing the following actions by a caching network storage server having a non-volatile solid-state memory (NVSSM) based cache, wherein the caching network storage server is disposed between a plurality of clients and a plurality of network storage controllers and configured to receive read requests from the clients to the network storage controllers:
allocating, by the caching network storage server, each of a plurality of portions of the cache to a different one of the plurality of network storage controllers in a network storage system, and
using the cache to temporarily store data in response to requests from one or more of the clients of the network storage controllers;
monitoring, for a time interval, a usage pattern of the cache by each of the network storage controllers; and
allocating, after the time interval, a new portion of the cache to a particular one of the network storage controllers, the allocating the new portion including
determining a size of the new portion based on the usage pattern of the cache by the particular one of the network storage controllers;
wherein the new portion is one of a plurality of new portions of the cache, and wherein the allocating further includes allocating, after the time interval, each of the new portions of the cache to a different one of the network storage controllers.

2. The method as recited in claim 1, wherein monitoring the usage pattern of cache includes
monitoring, for each of the portions, at least one of (a) a current percentage of cache hit, or (b) a current response time for the requests from the plurality of clients.

3. The method as recited in claim 2, wherein allocating the new portion of the cache based on the usage pattern includes
determining at least one of (a) a projected percentage of cache hit for the new portion, or (b) a projected response time for the requests from the plurality of for a plurality of potential sizes of the new portion.

4. The method as recited in claim 3, further comprising:
comparing, for each of the potential sizes of the new portion, at least one of (a) the projected percentage of cache hit of the new portion with the current percentage of cache hit of the corresponding portion allocated to the particular one of the network storage controllers, or (b) the projected response time of the new portion with the current response time of the corresponding portion allocated to the particular one of the network storage controllers, and
selecting a specific size of the potential sizes of the new portion of the cache based on a result of comparison; and
reallocating the new portion of the cache having the selected specific size to the particular one of the network storage controllers.

5. The method as recited in claim 4, wherein selecting the specific size based on the comparison result includes:
selecting the specific size for which at least one of (a) the projected percentage of cache hit is higher than the current percentage of cache hit, (b) the projected percentage of cache hit is substantially the same as the current percentage of cache hit and the specific size of the corresponding new portion is smaller than the current size of the allocated portion, (c) the projected response time for the requests from the one or more clients is lower than current response time, or (d) the projected response time for the requests from the one or more clients is substantially the same as the current response time and the specific size of the corresponding new portion is smaller than the current size of the allocated portion.

6. The method as recited in claim 1, wherein the total collective size of all the portions is substantially same as the total collective size of all the new portions.

7. The method as recited in claim 1, wherein the NVSSM includes a solid-state drive (SSD) or a peripheral component interconnect express (PCIe) flash module.

8. The method as recited in claim 1, wherein the caching network storage controller is communicatively coupled with each of the network storage controllers via a network switch.

9. The method as recited in claim 1, wherein the allocation of the portions and the new portion is controlled by a network storage operating system executing on the caching network storage controller.

10. A method comprising:
   using, in a caching network storage controller, a non-volatile solid-state memory (NVSSM) based cache, the using the cache including temporarily storing data in response to data access requests from a plurality of clients to a plurality of network storage controllers, wherein the caching network storage controller is disposed between the plurality of clients and the plurality of network storage controllers and configured to receive read requests from the clients to the network storage controllers; and
   allocating, by the caching network storage controller, each of a plurality of portions of the cache to a different one of the network storage controllers, the allocating including determining a size of each of the portions based on a usage pattern of the cache by a corresponding network storage controller, the determining the size of each of the portions including
      determining, for each of the portions, at least one of (a) a projected percentage of cache hit, or (b) a projected response time for the requests from the one or more clients for each of a plurality of potential sizes of the corresponding portion,
      comparing, for each of the portions and for each of the potential sizes of the corresponding portion, at least one of (a) the projected percentage of cache hit with a current percentage of cache hit, or (b) the projected response time with a current response time, and
      selecting, for each of the portions, one of the potential sizes based on a result of the comparison;
   wherein the allocating of the portions includes allocating the portions in response to a trigger condition.

11. The method as recited in claim 10, wherein selecting one of the potential sizes based on the result of comparison includes
   selecting, for each of the portions, the one of the potential sizes for which at least one of (a) a projected percentage of cache hit is higher than the percentage of cache hit, (b) a projected percentage of cache hit is substantially the same as the percentage of cache hit and the one of the potential sizes is smaller than the size of a previously allocated portion, (c) a projected response time for the requests is lower than the response time, or (d) a projected response time for the requests is substantially the same as the response time and the one of the potential sizes is smaller than the size of the previously allocated portion.

12. The method as recited in claim 10, wherein comparing includes
   monitoring, for each of the portions and for a time interval, at least one of (a) the current percentage of a cache hit, or (b) the current response time for the requests from the one or more clients.

13. The method as recited in claim 10, wherein the trigger condition includes at least one of (a) an occurrence of a particular event, (b) a regular time interval, or (c) a predefined time of a day.

14. A computing device comprising:
   a memory containing machine readable medium comprising machine executable code having stored thereon instructions for performing a method of data caching; and
   a processor coupled to the memory, the processor configured to execute the machine executable code to cause the processor to:
   monitor usage patterns of a cache by a plurality of network storage controllers, wherein the cache includes a non-volatile solid-state memory (NVSSM) configured to temporarily store data from each of the network storage controllers in response to data access requests from a plurality of clients of the network storage controllers; and
   allocate each of a plurality of portions of the cache to a different one of the network storage controllers, wherein a size of each respective one of the portions is determined based on a particular usage pattern of the cache by a corresponding one of the network storage controllers, further wherein the computing device is disposed between the plurality of clients and the plurality of network storage controllers and configured to receive read requests from the clients to the network storage controllers;
   wherein the processor is further configured to monitor, for each of the portions and for a predefined time interval, at least one of (a) a current percentage of cache hit, or (b) a current response time for the requests from the one or more clients.

15. The computing device of claim 14, wherein the each of the network storage controllers include a persistent storage system to store data received from the one or more clients.

16. The computing device of claim 14, wherein the NVSSM includes a PCIe based flash module or SSD.

17. The computing device of claim 14 further comprising a network interconnect that allows communication between each of the network storage controllers and the computing device.

18. A computing device comprising:
   a memory containing machine readable medium comprising machine executable code having stored thereon instructions for performing a method of data caching; and
   a processor coupled to the memory, the processor configured to execute the machine executable code to cause the processor to:
   monitor usage patterns of a cache by a plurality of network storage controllers,
      wherein the cache includes a non-volatile solid-state memory (NVSSM) configured to temporarily store data from each of the network storage controllers in response to data access requests from a plurality of clients of the network storage controllers; and
   allocate each of a plurality of portions of the cache to a different one of the network storage controllers, wherein a size of each respective one of the portions is determined based on a particular usage pattern of the cache by a corresponding one of the network storage controllers, further wherein the computing device is disposed between the plurality of clients and the plurality of network storage controllers and configured to receive read requests from the clients to the network storage controllers;

wherein the processor is further configured to determine, for each of the portions, at least one of (a) a projected percentage of cache hit, or (b) a projected response time for the requests from the one or more clients for a plurality of potential sizes of the corresponding portion.

19. The computing device as recited in claim 18, wherein the processor is further configured to compare, for each of the portions and for each of the potential sizes of the corresponding portion, at least one of (a) the projected percentage of cache hit with a current percentage of cache hit, or (b) the projected response time with a current response time;

select, for each of the portions, a specific size of the potential sizes of the corresponding portion of the cache based on a result of the comparison; and reallocate, for each of the network storage controllers, the corresponding portion of the cache having the selected specific size.

20. The computing device as recited in claim 18, wherein the processor is further configured to select the specific size for which at least one of (a) a projected percentage of cache hit is higher than the percentage of cache hit, (b) a projected percentage of cache hit is substantially the same as the percentage of cache hit and the specific size of the corresponding new portion is smaller than the size of the previously allocated portion, (c) a projected response time for the requests from the one or more clients is lower than response time, or (d) a projected response time for the requests from the one or more clients is substantially the same as the response time and the specific size of the corresponding portion is smaller than the size of the previously allocated portion.

* * * * *